UNITED STATES PATENT OFFICE.

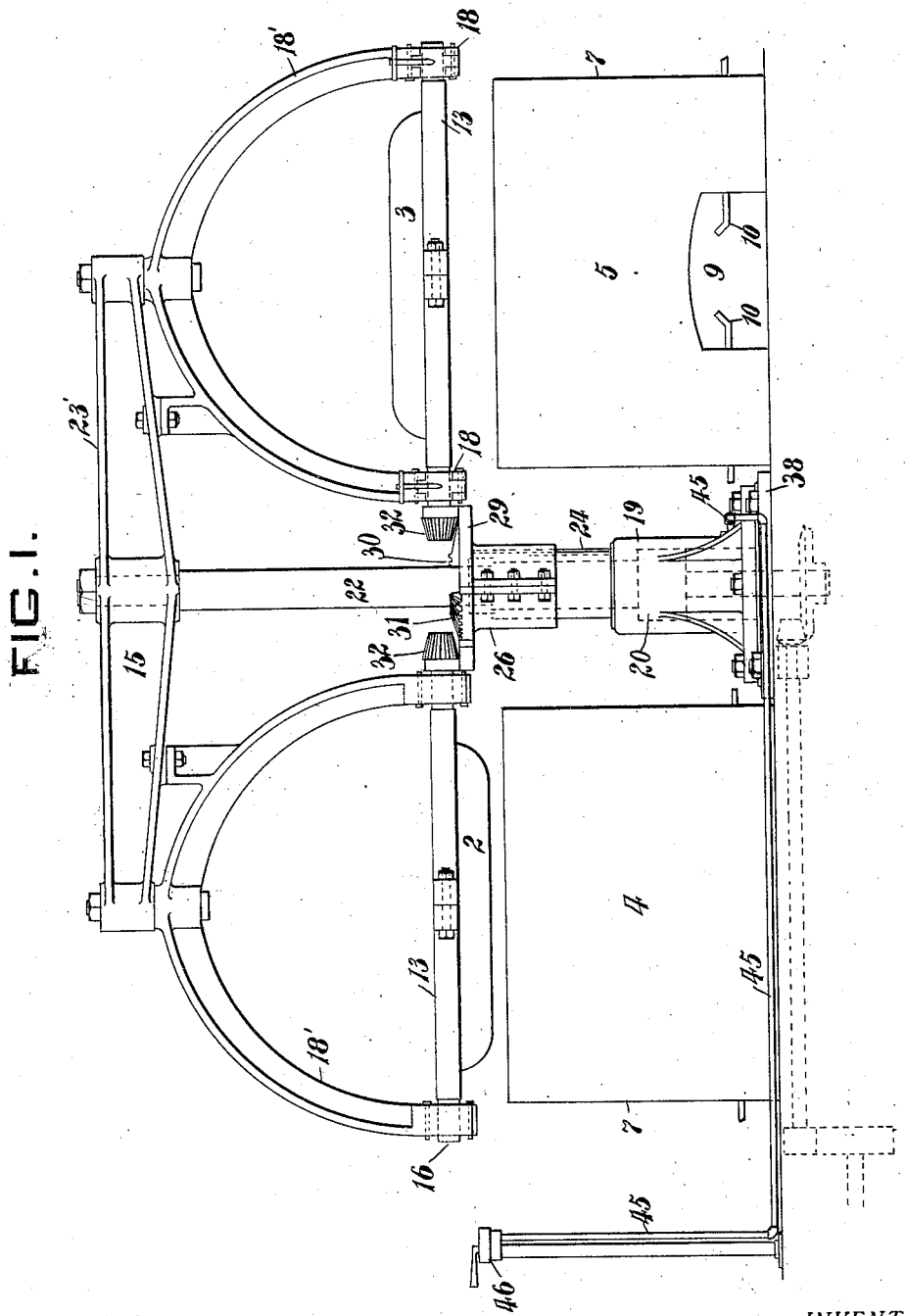

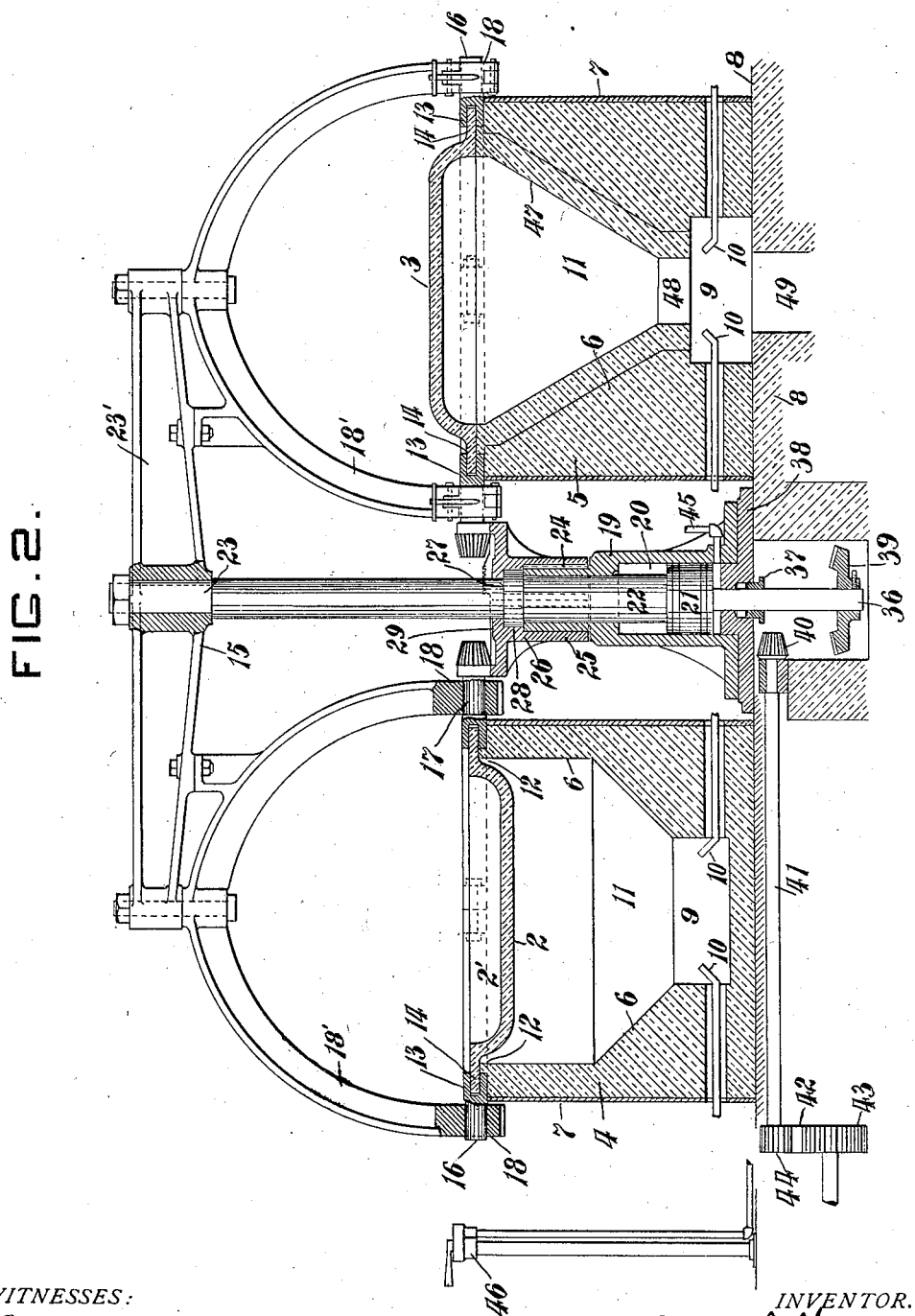

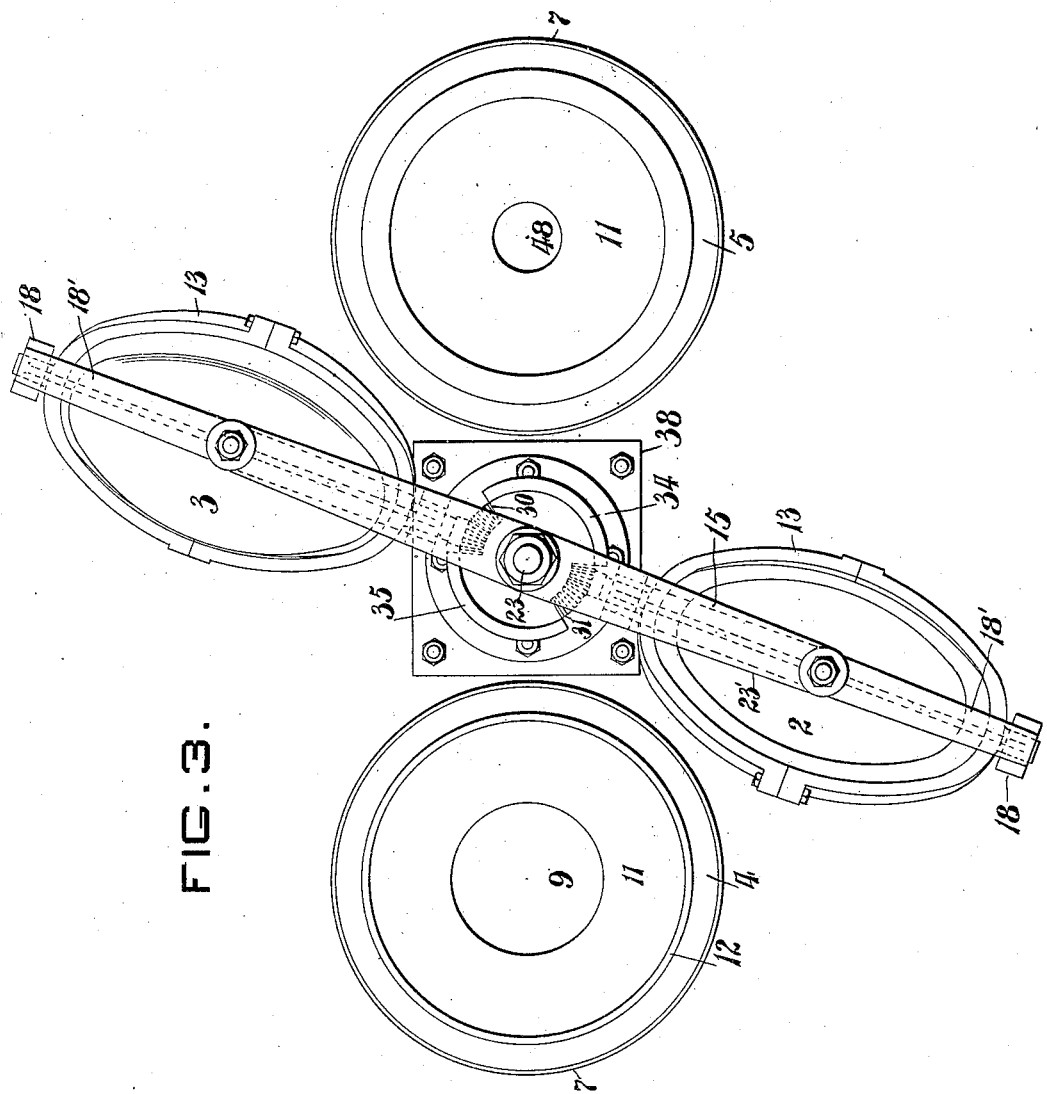

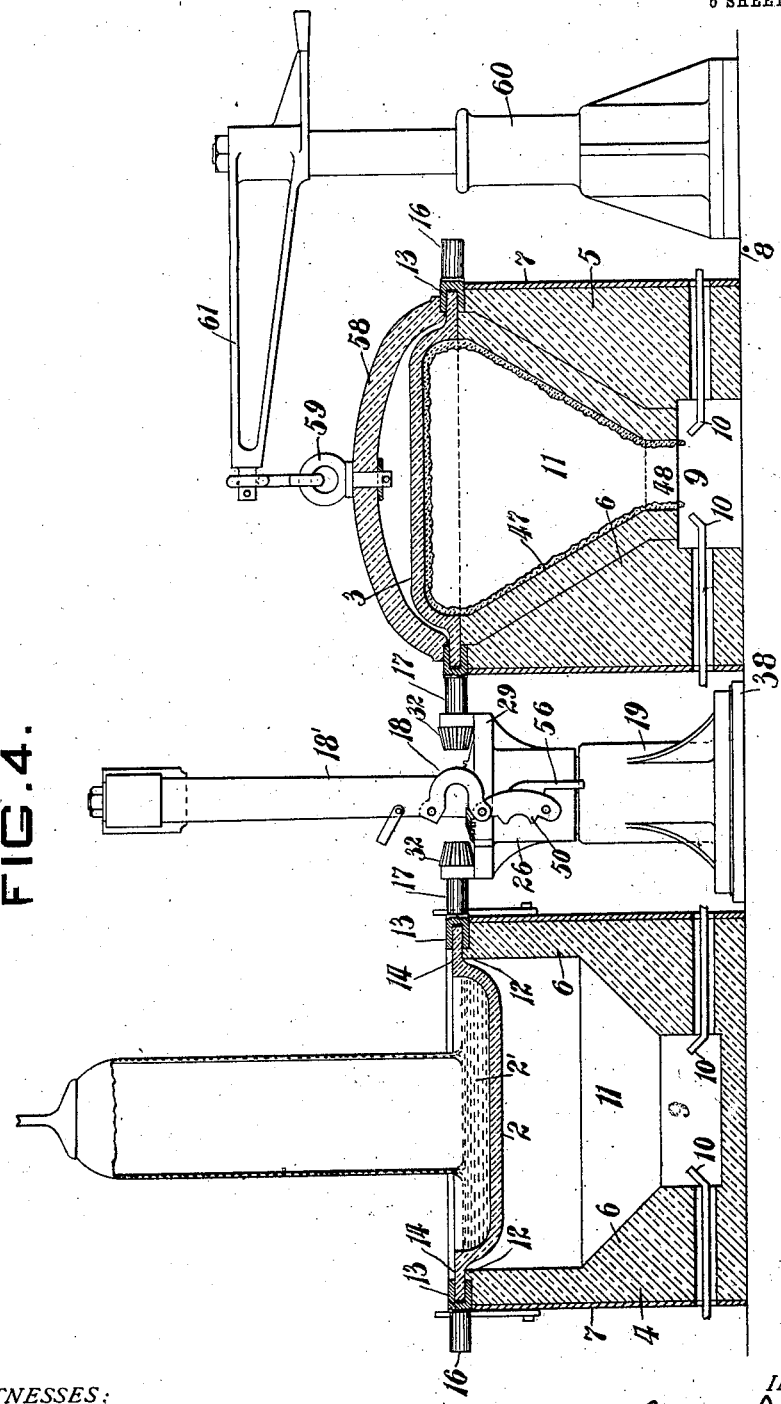

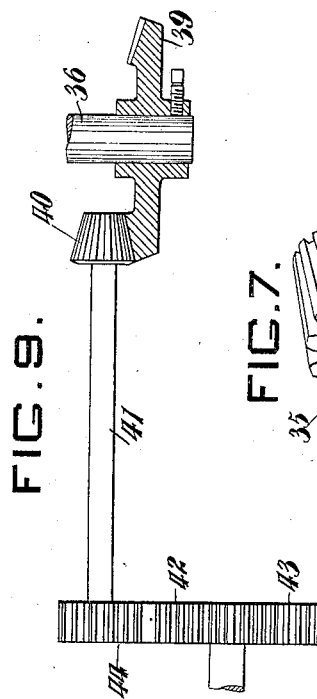
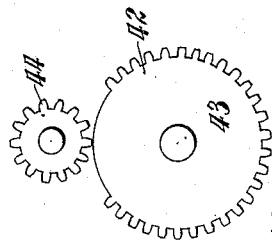
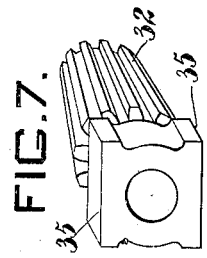
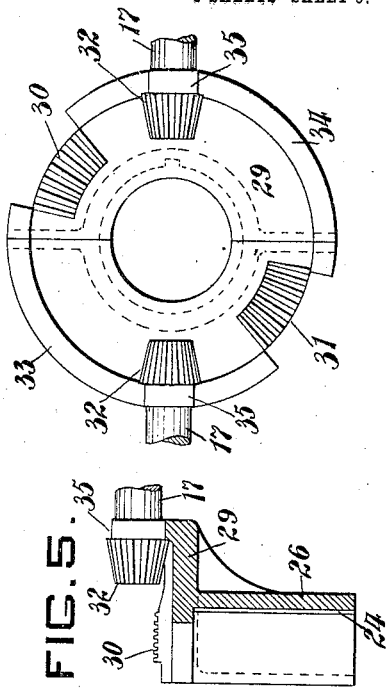
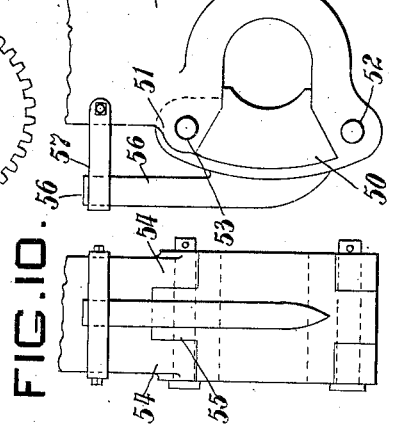

JAMES A. CHAMBERS, OF ALLEGHENY, PENNSYLVANIA.

GLASS-HANDLING APPARATUS.

1,037,592.

Specification of Letters Patent.

Patented Sept. 3, 1912.

Application filed February 23, 1911. Serial No. 610,423.

*To all whom it may concern:*

Be it known that I, JAMES A. CHAMBERS, a citizen of the United States of America, residing at Allegheny, in the county of Allegheny and State of Pennsylvania, have invented a new and useful Improvement in Glass-Handling Apparatus, of which the following is a full, clear, and exact description, reference being had to the accompanying drawings, which form part of this specification, and in which—

Figure 1 is a side elevational view of apparatus embodying my invention; Fig. 2 is a vertical longitudinal sectional view of the same; Fig. 3 is a top plan view showing the pot support shifted to such a position as to remove the pots from the furnaces; Fig. 4 is a longitudinal vertical sectional view, showing the pots in position on the furnaces and the support as disengaged from the pots and swung out of position therewith; Figs. 5 and 6 are detail sectional view and top plan view of the center portion of the apparatus, showing means for revolving the pots in their passage from one furnace to another; Fig. 7 is a perspective view of the beveled gear carried by one of the trunnions of each pot; Figs. 8 and 9 are respectively an end elevation and side elevation partly in section, showing gearing for rotating the pot support; and Figs. 10 and 11 are detail elevational views showing the support bearings for the trunnions or the drawing pot.

This invention relates to apparatus for drawing glass in which pots or receptacles are employed to receive the glass preparatory to being drawn therefrom in the form of cylinders or sheets, and it aims to provide simple and improved mechanism for mounting and manipulating the drawing pots. It has particular reference to that type of glass drawing apparatus disclosed in my co-pending application, Serial No. 610,422.

I will now describe my invention in connection with the accompanying drawings, so that others skilled in the art to which it appertains may understand and construct the same, it being premised, however, that various changes may be made in the apparatus shown in the drawings, without departing from my invention.

The preferable embodiment of my invention, as disclosed in the accompanying drawings, which apparatus, it will be understood, is merely one embodiment of my invention, is of a type in which the pots or receptacles are presented to individual furnaces and the reference numerals 2 and 3 represent glass drawing pots into which the glass is fed and from which it is drawn in the form of sheets or cylinders in the manner well known in the art.

The numerals 4 and 5 indicate two furnaces which may be of circular or rectangular form and which have the usual refractory linings 6 inclosed by the sheet metal shell or casing 7. These furnace bodies may rest upon any suitable refractory foundation 8 and have the bottom openings 9 into which lead the gas, oil, or other jets 10 which are directed upwardly into the combustion chambers 11 of the furnaces.

Each of the drawing pots 2 and 3, when it is presented to the furnace 4 for the drawing operation, rests upon the top of the furnace in the manner clearly shown in Figs. 2 and 4, the heat in the furnace chamber 11 below the pot keeping the pot with its molten glass fed thereto preparatory to drawing, warm and in proper condition for the drawing operation. The pot rests squarely on top of the furnace 4, when in position, so as to effect a seal between the underface of the pot and the furnace body, the refractory portion of the furnace having the upwardly projecting ledge or flange 12 which prevents destructive heating of the metallic ring 13 carried by each pot 2 and 3. The ring 13 of each drawing pot receives and encircles the outstanding flange or projection 14 of the pot and constitutes means for revolubly mounting the pot in the overhead support 15, which mounting is effected through the medium of the trunnions 16 and 17 carried by the ring 13 and which are received by the suitable hinged bearings 18 of the depending arms 18' of the support 15. This ring is preferably a two-part ring for convenience of application to and removal from the pot.

A standard 19 interposed between and in diametrical alinement with the furnaces 4 and 5 has the cylindrical base 20 in which operates the piston 21 fixedly carried by the vertically shiftable shaft 22. The shaft 22 is rotatably journaled in the standard 19 and has the reduced end 23 to which is fixedly secured the main portion or cross arm 23' of the support 15. Keyed, as at 24, against rotation, to the upper sleeve-like portion 25 of the standard 19 is the vertically shiftable sleeve-like member 26 which, as shown in Figs. 2 and 6, is made in two parts and freely encircles the collar 27 fixedly carried by the shaft 22, the member 26 having the annular recess 28 which receives the collar 27. The upper table-like portion 29 of this member 26 carries the gear-faces 30 and 31 which effect rotation of the beveled gears 32 carried by the pot trunnion 17 when the gears 32 are brought into mesh with the gears 30 and 31 as the support 15 is caused to be elevated by the piston 21 and then horizontally rotated, as described below, over the furnaces, for transference of the pots from one furnace to another. Also formed on the upper face 29 of the member 26 are the smooth-faced raised curved tracks 33 and 34 which extend between the terminals of the gears 30 and 31 and over which the flat faces 35 of the gears 32 ride when they pass from the gears 30 and 31 in the rotatory shifting of the support 15. The shaft 22 also has the lower reduced portion 36 which passes through the stuffing box 37 of the base face-plate 38 of the standard 19 and cylinder 20. To the lower end of the shaft section 36 is fixedly secured the beveled gear 39 which is so positioned thereon as to be brought into mesh with the beveled gear 40 carried by the horizontal rotatable shaft 41, when the support 15 is caused to be elevated by the piston 21. The shaft 41 may have connection, for rotation thereof, with any suitable source of power. This connection is made preferably through the intermediary of the mutilated-gearing arrangement 42 of such character that one revolution of the gear 43 thereof will bring about, through the gear 44, revolutions of the shaft 41, sufficient to give the vertical shaft 42 and consequently the support 15 a one-half revolution.

The numeral 45 indicates a suitable pipe for conveying air or other operating fluid to the cylinder 19. This pipe 45 leads to, and connects with, the source of supply at the suitable controlling valve 46.

With the pot 2 in the position shown in Fig. 2, the molten glass may be ladled or otherwise fed into the pot cavity 2' preparatory to being drawn therefrom in the making of glass cylinders or sheets, the pot and glass being kept in a warm condition favorable to drawing of the glass, by the heat in the furnace 4. After the glass has been drawn, and it is desired to present a clean drawing pot and new batch of glass for another drawing operation, the valve 46 is turned in such a manner as to feed the compressed air or other operating fluid into the cylinder 20, causing the piston carried by the shaft 22 to be forced upwardly. The upward travel of the piston 21 causes the shaft 22 to be shifted upwardly and the shaft in turn causes the support 15 carrying the pots 2 and 3, to be elevated. This upward travel of the shaft 22 is of a distance sufficient to cause the drawing pots to clear the tops of the furnaces 4 and 5, thereby enabling the support 15 to be horizontally rotated by the shaft 22. As stated above, the elevation of the shaft 22 brings the gear 39 into mesh with the gear 40 whereby rotation of the support through the rotatory shaft 41 is effected. Such rotation of the support is clearly shown in Fig. 3. As the support passes from the furnaces in such a manner as to bring the pots 2 and 3 out of superposed position therewith, the gears 32 of the pot trunnion 17, by this horizontal rotatory travel of the support 15, are caused to sweep across the gears 30 and 31 of the member 26 which has been elevated with the shaft 22 and support 15, but which is prevented from rotating therewith, by means of the key and key-way 24 spoken of above. This travel of the gears 32 over the gears 30 and 31 causes the pots 2 and 3 to revolve on their trunnions 16 and 17, the pot 2 assuming a turned-over position with the pot cavity placed downward while the pot 3 which has, before the rotation of the support assumed this position with the cavity downward, is turned to an upright position preparatory to its positioning over the furnace 4; the pot 2, after turning downward, assuming, as the support 15 continues to rotate, a position over furnace 5 simultaneously with the shifting of pot 3 into position over furnace 4, by reason of the fact that these two drawing pots are disposed in alinement with the furnaces. After the pots 2 and 3 have thus been turned by the partial rotation of the support, with the continued rotation of the support to bring the pots into their respective positions with the furnaces, and with the passage of the gears 32 from the gears 30 and 31, the straight-faced portions 35 of the gears 32 pass to the smooth-faced racks 33 and 34 which serve in conjunction with these faces 35 to prevent further rotation of the pots after they have been turned.

With the release of the pressure from the cylinder 20 by turning the valve 46, the support 15 lowers, bringing the pots into seating engagement with the tops of the furnaces; the upright pot over furnace 4 and the downturned pot over furnace 5. As the downturned pot is received by the furnace 5, the heat of the furnace melts the chilled remaining glass adhering to the cavity of the used pot, the melted glass flowing down the furnace lining 47, through the neck 48 to the suitable floor collecting passageway 49.

It will be seen that the upper face of the refractory lining 47 of the furnace 5 contacts with the refractory portion of the superposed downturned pot at a point inside the pot ring 13, thus protecting this metal ring, as in the case with the furnace 4, against destructive heating by the furnace.

With the pot presented to the furnace 4, in an upright position preparatory to receiving the glass, as described above in connection with the operation in turning the pots, before the glass can be drawn from the pot, it is necessary to rotatively shift the support 15 so as to bring the cross arm 23' and arms 18' out of the zone of the drawing pot over furnace 4 so as to permit of the upward drawing of the sheet or cylinder from the glass in the pot. In Fig. 4 I show the support 15 as being shifted to this inoperative position, and in order to bring about ready and easy detachment of the support from the pots positioned over the furnaces, I form the bearings 18 of the arms 18' with the hinged block 50 which interlocks as at 51 with the arm 18', as shown in Figs. 10 and 11; the hinged connection with the arm 18 being at 52. At 51 where the block 50 interlocks with the arm 18 I provide the locking pin 53 which passes through the interlocking portions 54 of the arm 18 and 55 of the block 50. This block 50 also has the upwardly extending handle 56 which is caught, when the block is in closed position, by the pivoted strap or yoke 57. It will be seen that when it is desired to free the support 15 from the pots, the pin 53 is withdrawn, whereby the block 50 may be swung from the rest of the bearing, by the handle 56, as shown in Fig. 4. Of course, I do not desire to limit myself to this particular break-bearing for effecting connection between the arms 18' and pot trunnions, it being apparent that various forms of connections may be devised by the mechanic without departing from my invention.

During the draining of the downturned pot over furnace 5, it may be desirable at times to conserve the heat of the pot so that when it is placed over furnace 4 it will not require further preparatory heating. For this purpose I provide the dome or shield 58, as shown in Fig. 4, made of, preferably, refractory material and provided with the lifting eye 59 by means of which it may be brought into and out of operative position. When in position, this dome covers the upturned pot bottom and serves to prevent dissipation of the heat therefrom during the draining of the glass from the pot cavity. Any suitable means may be employed for lifting the dome into and out of position. The device shown for this purpose is substantially that disclosed in my co-pending application, Serial No. 610,522, and comprises the suitable pneumatic lifting jack 60 having the extending arm 61 which connects with the eye-bolt 59 of the pot dome when it is desired to place or remove the dome. The placing and removing of this dome 58 over the furnace 5 and respective pot is preferably done while the support 15 assumes its inoperative position crosswise between the furnaces.

It will be apparent that changes may suggest themselves to the skilled mechanic, which would not be a departure from my invention and I do not, therefore, limit myself to the specific form of apparatus shown in the drawings.

The advantages of my invention reside in the simplicity and compactness of the apparatus and the efficiency in operation, resulting in mechanism by which the glass may be expeditiously drawn.

Having thus described my invention, what I claim and desire to secure by Letters Patent is:

1. In glass handling apparatus, a furnace, a pot, a horizontally shiftable support for the pot, means for horizontally shifting the support whereby the pot may be presented to the furnace, and means for effecting disengagement of the support from the pot after operating to bring the pot into position.

2. In glass handling apparatus, a furnace, a pot, a horizontally and vertically shiftable support for the pot, means for horizontally shifting the support whereby the pot may be brought into and out of position with the furnace, means for effecting vertical shifting of the support, for operating, presenting to and removing the pot from the furnace, and means whereby the support may be disconnected from the pot after the latter has been presented to the furnace.

3. In glass handling apparatus, a plurality of furnaces, a pot, a support for the pot, mounted to be horizontally shiftable, for bringing the pot from one furnace to another, and means whereby disengagement of the support from the pot may be effected after said pot has been presented to a furnace.

4. In glass handling apparatus, a plurality of furnaces, a pot, a horizontally shiftable support for the pot for bringing the pot from one furnace to another, means for shifting the support, and means whereby disengagement of the support from the pot may be effected after said pot has been presented to a furnace.

5. In glass handling apparatus, a plurality of furnaces, a pot, a horizontally and vertically shiftable support for the pot, means for horizontally shifting the support to bring the pot from one furnace to another, means for vertically shifting the support to effect operative presentation of the pot to the furnace, and means whereby the support may be disconnected from the pot, after operating, to present the pot to a furnace.

6. In glass handling apparatus, a plurality of furnaces, a plurality of glass drawing pots, a support for the pots and adapted to present one pot in drawing position over one furnace and to simultaneously present another pot in draining position over another furnace; and means whereby disengagement of the support from the pots may be effected after said pots have been presented to a furnace.

In testimony whereof, I have hereunto set my hand.

JAMES A. CHAMBERS.

Witnesses:
 M. A. KELLER,
 MARY A. BARTH.

Copies of this patent may be obtained for five cents each, by addressing the "Commissioner of Patents, Washington, D. C."